(12) United States Patent
Chang et al.

(10) Patent No.: US 9,742,597 B1
(45) Date of Patent: Aug. 22, 2017

(54) DECISION FEEDBACK EQUALIZER

(71) Applicant: Xilinx, Inc., San Jose, CA (US)

(72) Inventors: Kun-Yung Chang, Los Altos Hills, CA (US); Siok Wei Lim, Singapore (SG); Kee Hian Tan, Singapore (SG)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/084,351

(22) Filed: Mar. 29, 2016

(51) Int. Cl.
*H04L 25/03* (2006.01)

(52) U.S. Cl.
CPC .. *H04L 25/03057* (2013.01); *H04L 25/03885* (2013.01); *H04L 2025/03375* (2013.01); *H04L 2025/03764* (2013.01)

(58) Field of Classification Search
CPC ....... H04L 25/03057; H04L 2025/0349; H04L 25/03885; H04L 2025/03764; H04L 2025/03375
See application file for complete search history.

(56) References Cited

U.S. PATENT DOCUMENTS 8,837,570 B2  9/2014 Shvydun et al.
8,970,419 B2  3/2015 Farley et al.
2002/0012152 A1* 1/2002 Agazzi ............... H03M 1/0624
                                                    398/202
2005/0084028 A1* 4/2005 Yu .................... H04L 25/03057
                                                    375/267
2008/0049825 A1* 2/2008 Chen ................. H04L 25/03057
                                                    375/233

OTHER PUBLICATIONS

Bulzacchelli, John F. et al., "Power-Efficient Decision-Feedback Equalizers for Multi-Gb/s CMOS Serial Links (Invited)," Proc. of the 2007 IEEE Radio Frequency Integrated Circuits Symposium, Jun. 3, 2007, pp. 507-510, IEEE, Piscatawy, New Jersey, USA.

* cited by examiner

*Primary Examiner* — Vineeta Panwalkar
(74) *Attorney, Agent, or Firm* — David O'Brien

(57) ABSTRACT

An apparatus includes a decision feedback equalizer configured to receive a parallel signal generated based on a first clock. The decision feedback equalizer includes a first equalization block configured to receive a first symbol of a first set of parallel symbols provided by the parallel signal during a first clock cycle of the first clock. A decision feedback equalization is performed by the first equalization block to the first symbol to provide a first decision to a second equalization block. The second equalization block is configured to receive a second symbol of the first set of parallel symbols and perform a decision feedback equalization to the second symbol using the first decision received from the first equalization block to provide a second decision during the first clock cycle.

20 Claims, 15 Drawing Sheets

DECISION FEEDBACK EQUALIZER

TECHNICAL FIELD

Examples of the present disclosure generally relate to integrated circuits ("ICs") and, in particular, to an embodiment related to ICs including decision feedback equalizers.

BACKGROUND

As data rates increase to meet demand for higher data throughput, signals transmitted through a communication channel are increasing susceptible to corruption by frequency-dependent signal loss of the communication channel, such as inter-symbol interference (ISI), and other noise, such as crosstalk, echo, signal dispersion, and distortion. A decision feedback equalizer (DFE) may be used to remove ISI and other noise by using a feedback loop based on previously decided symbols from the received signal. However, a conventional DFE is limited to performing the ISI removal for a symbol in a single symbol period (also referred to as a "unit interval" or UI), which is the baud rate of the communication channel. This timing constraint may limit the operations of the DFE.

Accordingly, it would be desirable and useful to provide an improved way of implementing decision-feedback equalization that facilitates meeting a growing demand for higher throughput.

SUMMARY

In some embodiments in accordance with the present disclosure, an apparatus includes a decision feedback equalizer configured to receive a parallel signal generated based on a first clock. The decision feedback equalizer includes a first equalization block configured to receive a first symbol of a first set of parallel symbols provided by the parallel signal during a first clock cycle of the first clock and perform a decision feedback equalization to the first symbol to provide a first decision to a second equalization block. The second equalization block is configured to receive a second symbol of the first set of parallel symbols and perform a decision feedback equalization to the second symbol using the first decision received from the first equalization block to provide a second decision during the first clock cycle.

In some embodiments, the decision feedback equalizer includes a third equalization block configured to receive a third symbol of the first set of parallel symbols and perform a decision feedback equalization to the third symbol and provide a third decision to a storage element during the first clock cycle. The decision feedback equalizer further includes a first storage element coupled to the third equalization block and configured to provide the third decision received from the third equalization block to the first equalization block.

In some embodiments, the first equalization block is configured to receive a fourth symbol of a second set of parallel symbols provided by the parallel signal during a second clock cycle of the clock and perform a decision feedback equalization to the fourth symbol using the third decision received from the storage element to provide a fourth decision determined using the third decision received from the first storage element during the second clock cycle.

In some embodiments, the first storage element is a flip-flop.

In some embodiments, each of the first, second, and third equalization blocks includes a selection line input configured to receive a decision based on previously detected symbols and a selection element coupled to a plurality of speculation paths to select an output from the speculation paths using the selection line input.

In some embodiments, the selection element is a multiplexer.

In some embodiments, a delay between the first decision provided by the first equalization block and the second decision provided by the second equalization block is caused by the multiplexer of the second equalization block.

In some embodiments, the first storage element is configured to receive the third decision from the third equalization block at least a set-up time of the flip-flop prior to a next clock edge of the clock that triggers the flip-flop, and the first equalization block is configured to receive the fourth symbol at least a clock-to-Q time of the flip-flop after the next clock edge.

In some embodiments, symbols provided by the parallel signal are PAM-4 symbols.

In some embodiments, the parallel signal is provided by an analog-to-digital converter (ADC) using an input signal having a symbol rate. The symbol rate is N times a clock rate of the first clock, where N is a number of parallel symbols provided by the parallel signal.

In some embodiments in accordance with the present disclosure, a method includes providing a parallel signal generated based on a first clock; receiving, by a first equalization block, a first symbol of a first set of parallel symbols provided by the parallel signal during a first clock cycle of the first clock; performing, by the first equalization block, a decision feedback equalization to the first symbol to provide a first decision to a second equalization block; receiving, by the second equalization block, a second symbol of the first set of parallel symbols; and performing, by the second equalization block, a decision feedback equalization to the second symbol using the first decision received from the first equalization block to provide a second decision during the first clock cycle.

In some embodiments, the method includes receiving, by a third equalization block, a third symbol of the first set of parallel symbols; performing, by the third equalization block, a decision feedback equalization to the third symbol and provide a third decision to a storage element during the first clock cycle; and providing, by the first storage element, the third decision received from the third equalization block to the first equalization block.

In some embodiments, the method includes receiving, by the first equalization block, a fourth symbol of a second set of parallel symbols provided by the parallel signal during a second clock cycle of the clock; and performing, by the first equalization block, a decision feedback equalization to the fourth symbol using the third decision received from the storage element to provide a fourth decision determined using the third decision received from the first storage element during the second clock cycle.

In some embodiments, the method includes selecting, by a selection element of the second equalization block, an output from a plurality of speculation paths using the first decision received by the second equalization block.

In some embodiments, the method includes receiving, by the first storage element, the third decision from the third equalization block at least a set-up time of the flip-flop prior to a next clock edge of the clock that triggers the flip-flop; and receiving, by the first equalization block, the fourth symbol at least a clock-to-Q time of the flip-flop after the next clock edge.

In some embodiments, the method includes providing an analog input signal having a symbol rate to an analog-to-digital converter (ADC); and converting the analog input signal to the parallel signal using the ADC based on the first clock, where the symbol rate is N times a clock rate of the first clock, and where N is a number of parallel symbols provided by the parallel signal.

Other aspects and features will be evident from reading the following detailed description and accompanying drawings.

DETAILED DESCRIPTION

Figure 1:
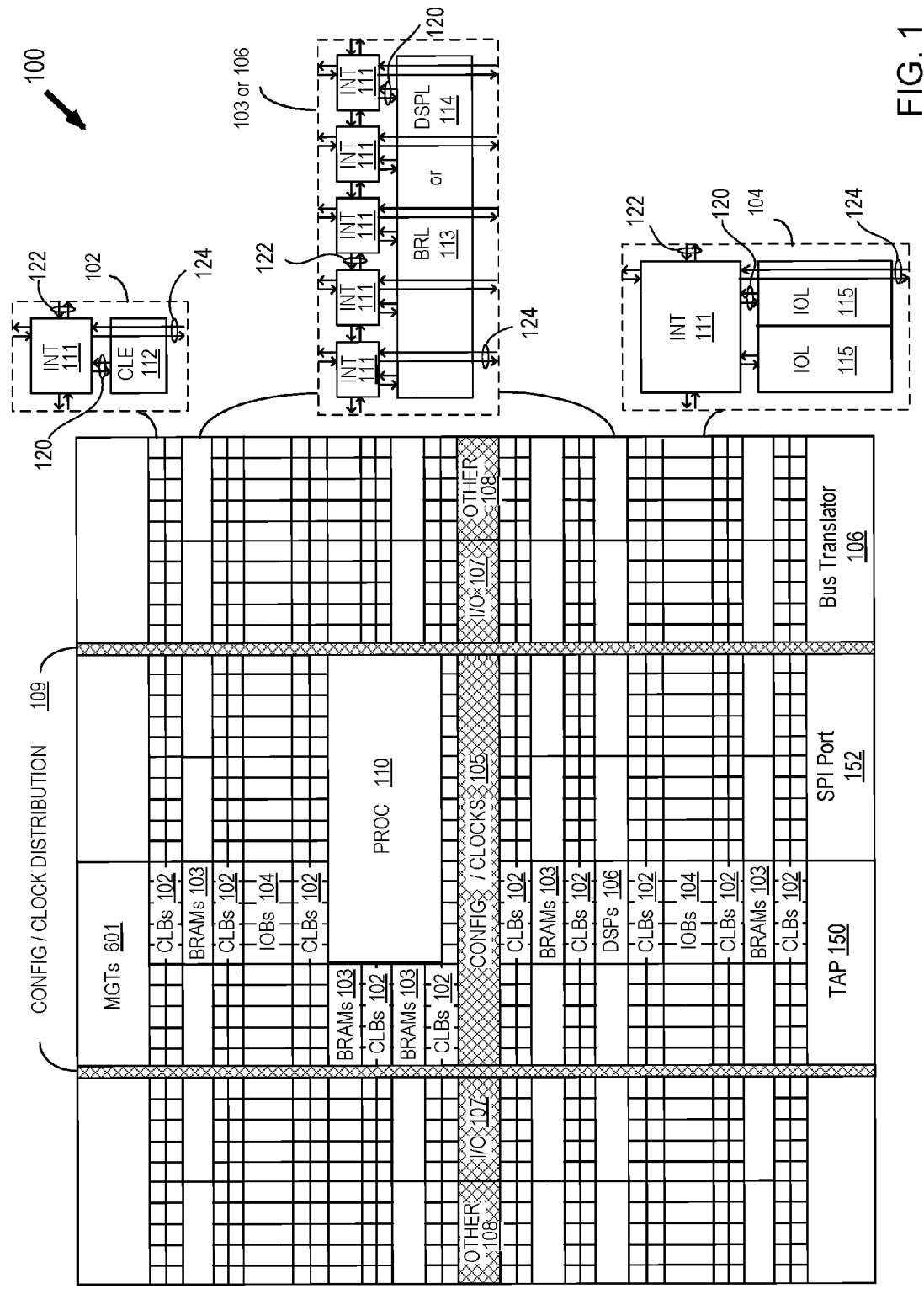
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. Generally, a DFE may adapt feedback from previously detected symbols to the equalization of currently detected symbols. An unrolled DFE may eliminate or "unroll" the feedback loop partially or fully by pre-computing all possible ISI approximations base on received symbol history, with the correct result selected by a multiplexer based on a previously detected bit. When symbols arrive in one UI at a time, for each symbol, functions including storing and aligning the previously detected symbol with the UI clock and selecting using the multiplexer need to be completed within the UI, which is challenging as the symbol rate increases.

As described below in additional detail, an analog-to-digital converter (ADC) may digitize an input signal with a particular symbol rate, and provide an output signal including multiple parallel symbols. A DFE is configured to perform equalization to the parallel symbols. By handling the decision feedback equalization to multiple parallel symbols, the timing requirements of a DFE are relaxed.

With the above general understanding borne in mind, various embodiments for providing decision feedback equalizers are described below.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), equalizers including decision feedback equalizers ("DFE"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or anti-fuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 103 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as complex programmable logic devices (CPLDs) or any type of programmable IC having a programmable interconnect structure for selectively coupling logic elements.

It is noted that the IC that may implement the decision feedback equalization is not limited to the exemplary IC depicted in FIG. 1, and that IC having other configurations, or other types of IC, may also implement the decision feedback equalization.

Figure 2:
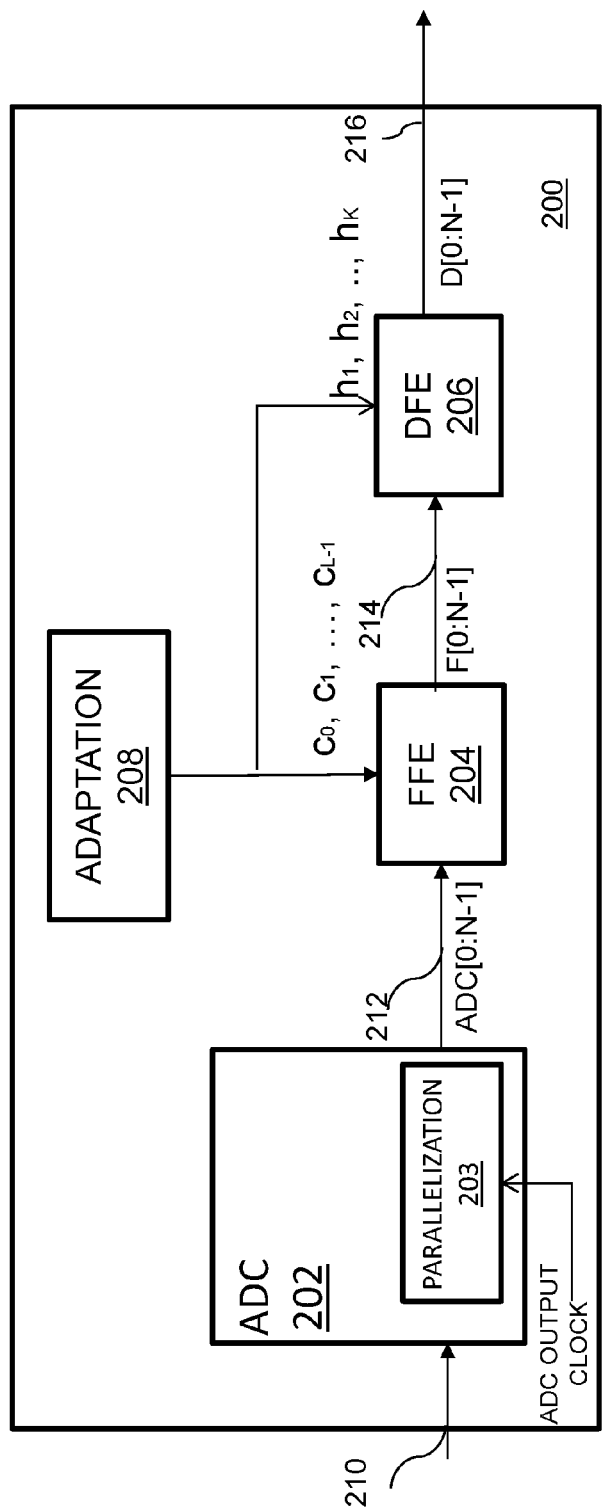
FIG. 2 is a block diagram illustrating an exemplary architecture for an IC using a decision feedback equalizer according to some embodiments of the present disclosure.

Referring now to FIG. 2, illustrated is an example of a communication system 200 including an ADC-FFE-DFE data path. The communication system 200 includes an analog to digital converter (ADC) 202, a feed forward equalizer (FFE) 204, and a decision feedback equalizer (DFE) 206.

It is noted that various signal modulation and de-modulation techniques might be employed by the communication system 200. The various signals described herein might employ single-bit or multi-bit data symbols based on various data encoding schemes, such as pulse amplitude modulation (e.g., PAM-4). Further, signal amplitudes might be expressed herein as −1 to 1 such as for Non-Return to Zero (NRZ) signaling, although any signal-encoding scheme might be employed.

In some embodiments, the ADC 202 may receive an analog signal 210, and provides digital conversion of the input analog signal 210. The ADC 202 may sample and digitize the input analog signal 210 based on timing and control of clock and data recovery (CDR) circuitry that is based on a received clock signal based on timing of the received input analog signal 210's data symbols. In some embodiments, the ADC 202 includes a parallelization block 203, which may convert or parallelize the digitized symbols into a parallel format based on an ADC output clock. For example, a serial-to-parallel converter of the parallelization block 203 may convert the serially received digitized symbols, and output N symbols in each clock cycle of the ADC output clock, where N is a positive integer (e.g., N=32). In some embodiments, the ADC 202 may include N analog-to-digital converters arranged such that each converter may digitize every $N^{th}$ received symbol from the input signal 210, which may provide N parallel symbols in each clock cycle of the ADC output clock. The output 212 of the ADC 202 may include N parallel signals, where each of the N parallel signals may provide one of N parallel symbols ADC[0:N−1] during a particular clock cycle.

In some embodiments, by providing symbols in parallel from the ADC 202, the symbol rate (also referred to as baud rate and/or modulation rate) of the input signal 210 received by the communication system 202 may be reduced by a factor of N to facilitate digital processing of the digitized symbols by the FFE 204 and DFE 206. In other words, an ADC output clock cycle for the output 212 may be N times the UI of the input signal 210. For example, where the input signal 210 has a symbol rate of 32 giga-symbols per second (32 Gbaud) and a UI of 31.25 picoseconds (ps), the clock cycle of the ADC output clock is N*UI (e.g., 32*31.25 ps, where N=32).

In some embodiments, an optional FFE 204 receives the parallel data ADC[0:N−1] at its input, and performs feed forward equalization to the N symbols in the parallel data ADC[0:N−1] using coefficients (also referred to as taps) $c_0, \ldots, c_{L-1}$, where L is the number of FFE taps. The FFE 204 may provide an output 214 to an input of the DFE 206. The output 214 may include N parallel symbols, which may be denoted as F[0:N−1], which includes parallel data F[0], F[1], . . . , and F[N−1]. In some embodiments, the $i^{th}$ symbol in the parallel data F[0:N−1] corresponds to the $i^{th}$ symbol of the ADC[0:N−1].

In some embodiments, the DFE 206 receives F[0:N−1], which includes parallel symbols F[0], F[1], . . . , and F[N−1] at its input, and performs decision feedback equalization to the N symbols in the parallel data F[0:N−1] using coefficients $h_1, h_2, \ldots, h_k$, where k is the number of DFE taps. The DFE 206 may provide an output 216, which may be denoted as to as D[0:N−1].

In some embodiments, the communication system 200 may also include an adaptation block 208. The adaptation block 208 may be configured to adjust coefficients for the FFE 204 and the DFE 206. In some examples, the adaptation block 208 may automatically adjust coefficients $c_0, \ldots, c_{L-1}$ for the FFE 204 and/or coefficients $h_1, h_2, \ldots, h_k$ for the DFE 206 using least mean square (LMS) or any other suitable adaptive algorithms. In some examples, the adaptation block 208 may be used to manually adjust the coefficients for the FFE 204 and the DFE 206.

Figure 3:
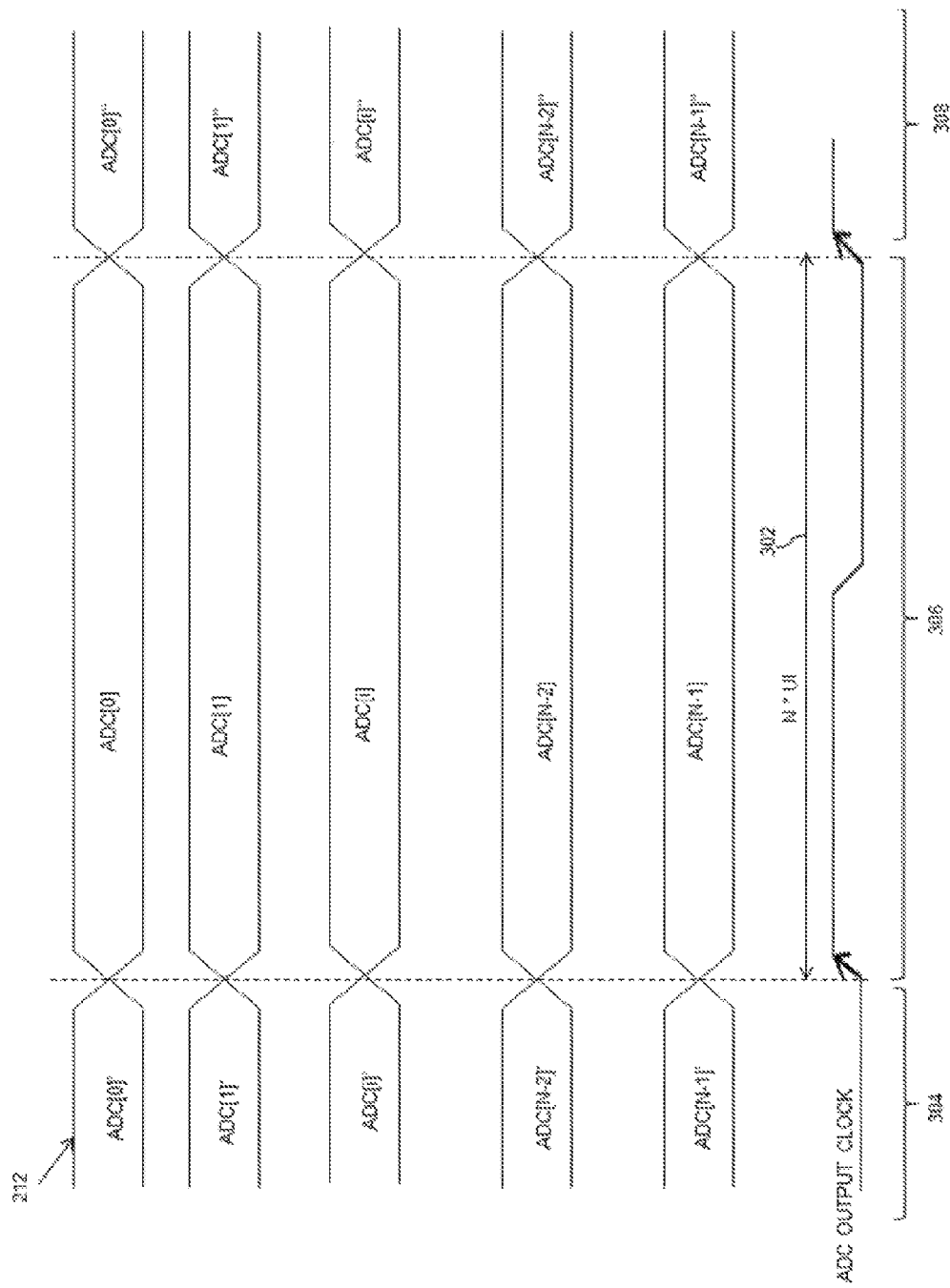
FIG. 3 is a timing diagram of an exemplary parallel data input including parallel symbols according to some embodiments of the present disclosure.

Referring now to FIG. 3, illustrated is a timing diagram of the output 212 of the ADC 202. As discussed above with reference to FIG. 2, the clock cycle time 302 (also referred to as a slow clock cycle time) for the ADC output clock (also referred to as a slow clock cycle) may be computed as N*UI, where the UI is the unit interval of the received symbols of the input signal 210. In an example, the slow clock cycle time equals to 32*31.25 ps, which is 1000 ps, where the symbol rate of the signal 210 is 32 Gbaud, the UI is 31.25 ps, and N is 32. As illustrated in the example of FIG. 3, at each ADC clock cycle, the output 212 includes N parallel symbols. For example, at the ADC clock cycle 304, the parallel data 212 includes N parallel symbols includes symbols ADC[0]', ADC[1]', . . . , ADC[N−1]'. At the ADC clock cycle 306, the parallel data 212 includes N parallel symbols including symbols ADC[0]', ADC[1], . . . , ADC[N−1]. At the ADC clock cycle 308, the parallel data 212 includes N parallel symbols including symbols ADC[0]", ADC[1]", . . . , ADC[N−1]".

Figure 4:
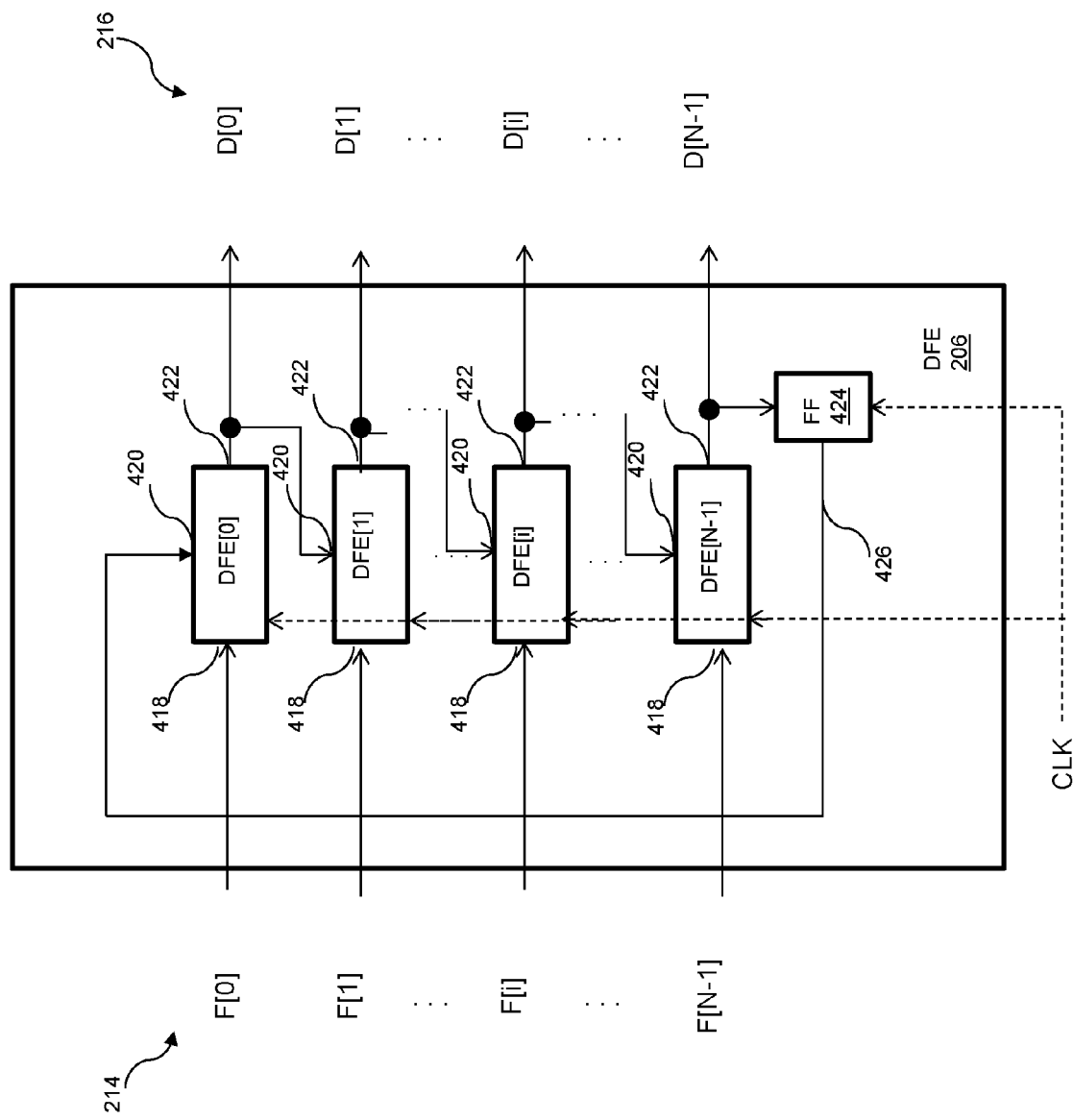
FIG. 4 is a block diagram of an exemplary decision feedback equalizer.

Referring now to FIG. 4, illustrated is an example of a DFE 206, where the DFE 206 is a one-tap DFE and DFE tap number k is one. The DFE 206 may include N DFE blocks, where the $i^{th}$ DFE block may be referred to as DFE[i], where i is an integer and 0<=i<=N−1. As illustrated in FIG. 4, each of the N DFE blocks may include an input 418 receiving a corresponding symbol of the FFE parallel output 214, a select line input 420 receiving previously detected data, and provide a detected data output 422. For example, the $i^{th}$ DFE block DFE[i] may receive F[i] of the FFE parallel output 214 at its input 418, and provide its output 422 as D[i] of the DFE output 216.

As illustrated in FIG. 4, in some embodiments, for each DFE[i] where 0<=i<=N−2, the DFE[i] may send its output 422 D[i] to the select line input 420 of DFE[i+1]. In some examples, one or more selection elements (e.g., one or more multiplexers) of the DFE[i+1] may use the received detected data D[i] to select the detected data output 422 of the DFE[i+1] (e.g., selecting the output 422 from multiple speculation paths). The selection elements may cause a delay between the output 422 (e.g., D[i+1]) and the select line input 420 (e.g., D[i]), which may be referred to as a selection delay. In some examples, a selection delay caused by the multiplexer may be referred to as a mux delay. For example, the mux delay may be about 28 ps. As illustrated in FIG. 4, in some examples, for each DFE[i] where 0<=i<=N−2, the output 422 of DFE[i] may be sent directly to the detected data input 420 of DFE[i+1] without using a data storage element (e.g., a flip flop) to hold the data D[i].

In some embodiments, the output 422 of a DFE block may be sent to another DFE block to perform equalization of a symbol of the next clock cycle. Therefore, a data storage element may be used to hold the output 422 of the DFE block. For example, in the example illustrated in FIG. 4, in the last DFE block DFE[N−1], a data storage element 424 (also referred to as FF 424) is coupled to receive D[N−1] from the output 422 of the DFE[N−1]. In some embodiments, the data storage element 424 is a flip-flop (FF). An output 426 of the flip-flop 424 may then be sent to the select line input 420 of the DFE[0]. In some embodiments, the DFE[0] may use the received detected data D[N−1] to decide the detected data output 422 of the DFE[0] for a received symbol in the next clock cycle. As such, the data storage element 424 may be used to store the detected data D[N−1] and align the detected data D[N−1] with the next clock cycle.

As illustrated in the example of FIG. 4, by providing an input including N symbols in parallel, the timing requirements of the DFE 206 may be relaxed. For example, compared to handling symbols arriving in one UI at a time, in some examples, the DFE 206 may not use a data storage element for each symbol to align the previously detected symbol with a fast UI clock (e.g., with a clock cycle time of UI). Instead, for all the N symbols received in the parallel, a single data storage element is used to store and align the output of the last DFE block DFE[N−1] with a slow clock (e.g., with a clock cycle time of N*UI).

Figure 5:
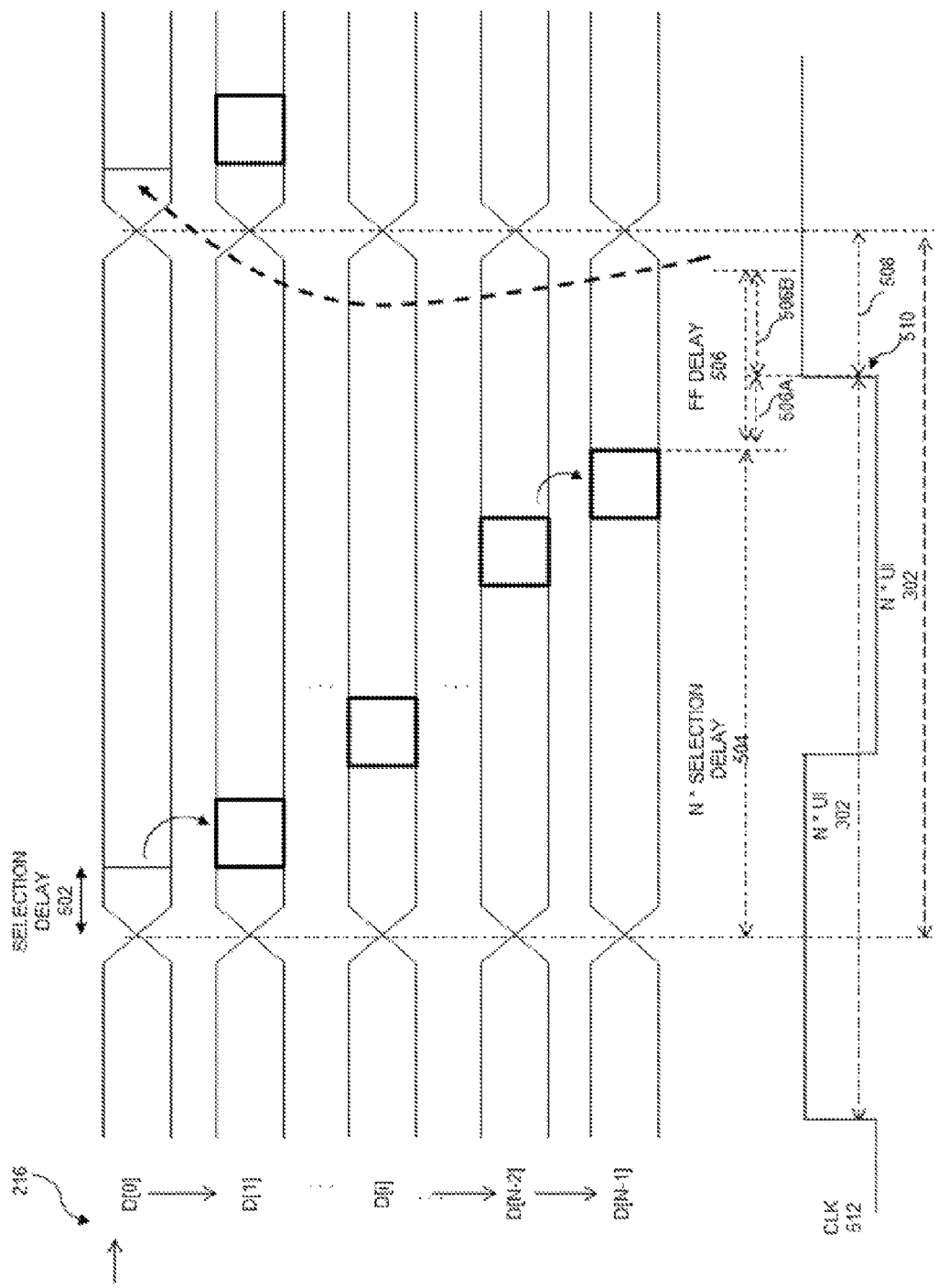
FIG. 5 is a clock diagram of signals of an exemplary decision feedback equalizer according to some embodiments of the present disclosure.

Referring now to FIG. 5, illustrated is an example of a timing diagram of the DFE 206 of FIG. 4. In some embodiments, to allow the DFE 206 to operate at a higher frequency, the previously detected data (e.g., the FF output 426) need to have settled stably at the select line input 420 of the DFE[0] when the DFE[0] makes the data decision for equalizing the input data F[0] from the next clock cycle. Accordingly, the timing requirements of the DFE 206 may be provided as follows:

$(N+k-1)*\text{Selection Delay}+FF\text{ Delay}<=N*UI$, wherein N is the number of symbols in the multiple parallel symbols, k is the DFE tap number, Selection delay is a delay caused by making the data decision in a DFE block (e.g., by selecting from multiple speculation paths using a multiplexer), and FF Delay (also referred to as storage delay) is a delay caused by the data storage element (e.g., FF 424) of the DFE[N−1]. In the example of the DFE 206 of FIG. 4, where the DFE tap number k is one, the timing requirements of the DFE 206 may be provided as follows:

$N*\text{Selection Delay}+FF\text{ Delay}<=N*UI$.

As illustrated in the example of FIG. 5, there is selection delay 502 between D[i] and D[i+1], where i is an integer, and 0<=i<=N−2. The total selection delay 504 between the data input 214 and the D[i+1] is N*Selection delay.

In some embodiments, to leave a window for some of the delays required by the data storage element 424, the data input 212 to the DFE arrives with a data delay 508 (e.g., about 50 ps) after the clock rising edge 510 of the clock 512 (also referred to as the slow clock 512). For example, an FF 424 may require an FF delay 506 including an FF set up time 506A (e.g., about 13 ps) and an FF clock-to-q delay (Clk2q) 506B (e.g., about 21 ps). The FF set up time 506 A may be the minimum amount of time that D[N−1] has been sent to the FF 424 before the clock rising edge 510. An FF Clk2q 506B may be the time that it takes for the output 426 of the FF 424 to be stable after the clock rising edge 510. In some embodiments, because the data delay 508 between the clock rising edge 510 and the data input 212 may be used to complete the FF Clk2q 506B, the data delay 508 is greater than the FF Clk2q 506B. In some embodiments, both the FFE 202 and the DFE 204 are clocked using the same slow clock 512. In some examples, the slow clock 512 has the same clock period (e.g., N*UI) as the ADC output clock.

Figure 6:
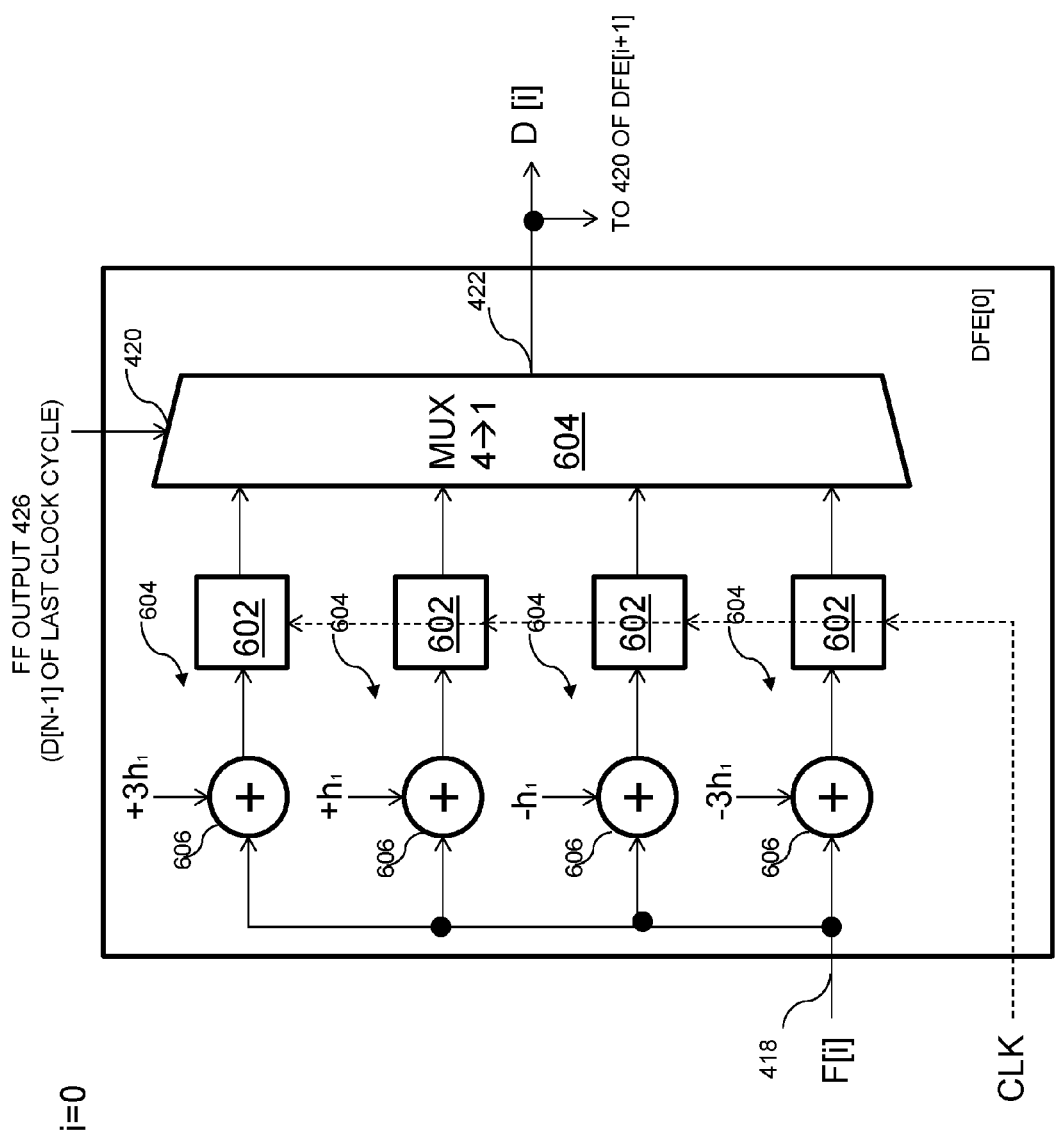
FIG. 6 is a block diagram of an exemplary DFE block of the decision feedback equalizer according to some embodiments of the present disclosure.
Figure 7:
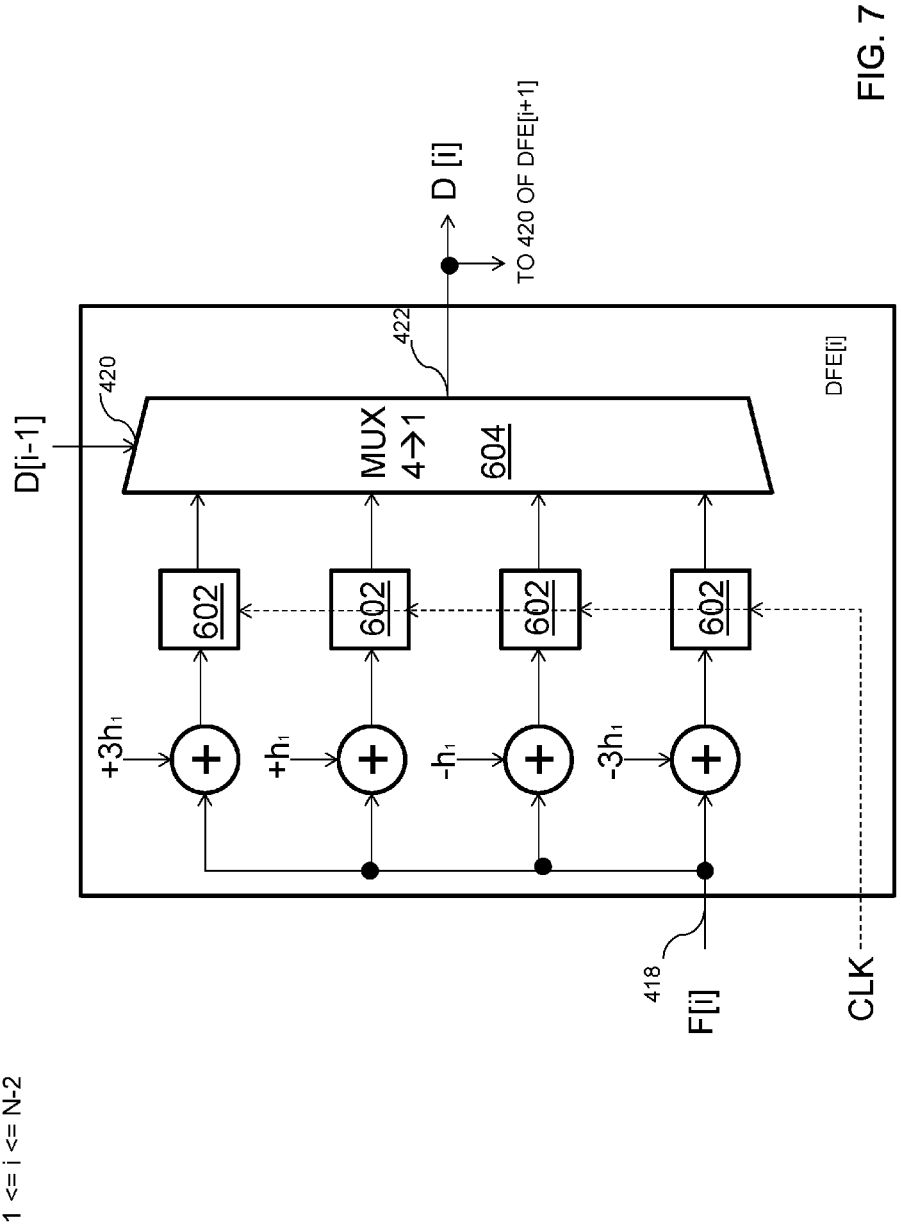
FIG. 7 is a block diagram of an exemplary DFE block of the decision feedback equalizer according to some embodiments of the present disclosure.
Figure 8:
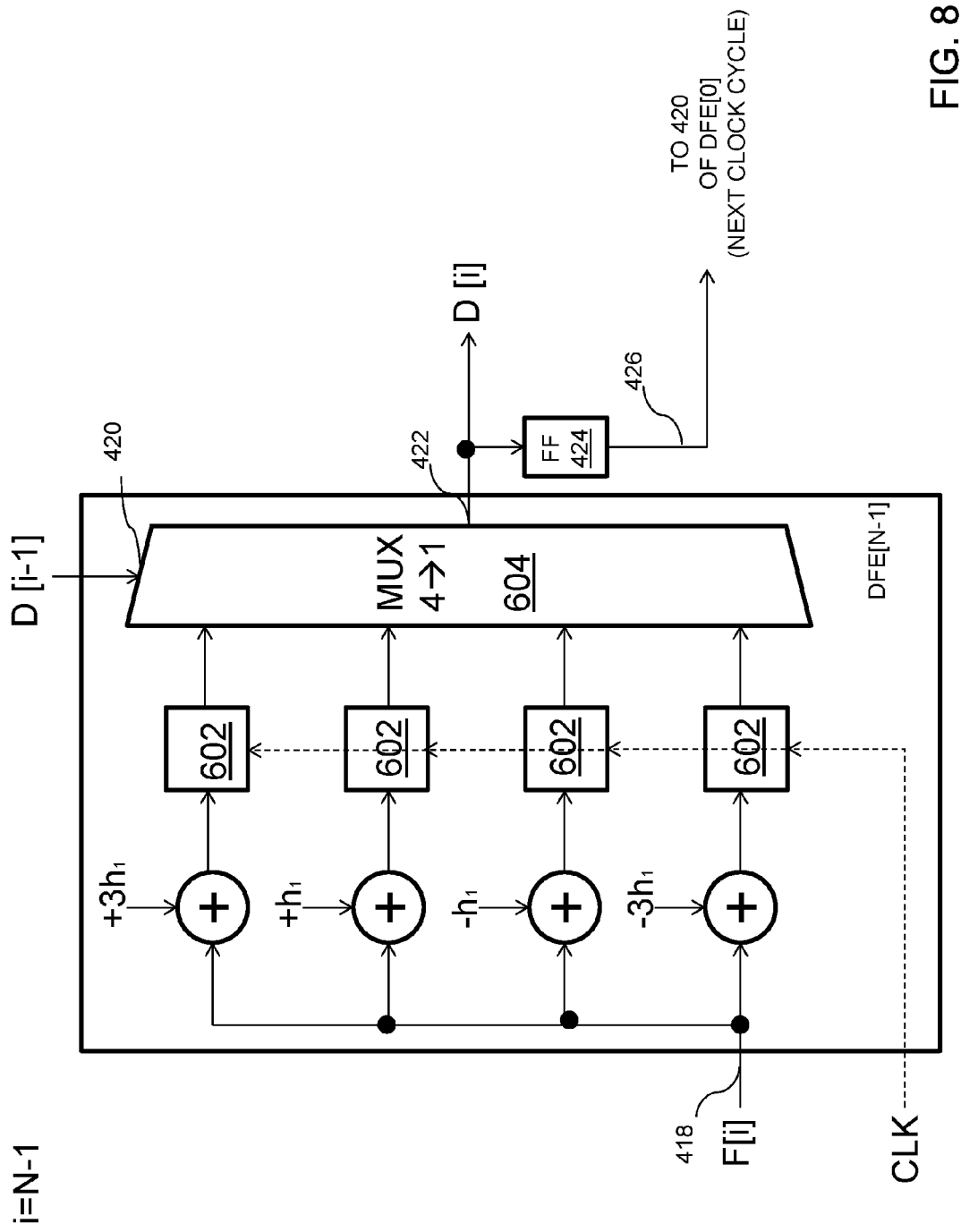
FIG. 8 is a block diagram of an exemplary DFE block of the decision feedback equalizer according to some embodiments of the present disclosure.

Referring now to FIGS. 6, 7, and 8, illustrated are examples of the details of the DFE blocks of the DFE 206. In some embodiments, speculation (also known as loop-unrolling) may be used to relax the timing requirements of the DFE 206. In the illustrated example, the symbol is a 4-level pulse amplitude modulation (PAM-4) symbol, each of which may have one of four different values. To compensate the ISI caused by the previous symbol, because the previous PAM-4 symbol may have one of four different values (with normalized signal levels of −3, −1, +1, and +3), each DFE block now has four speculative paths 604 with tap weights of +3h1, +h1, −h1, and −3h1, respectively. For each speculative path 604, the respective tap weight is applied to the input data 418 (e.g., by using an adder 606), and the output of the adder 606 is provided to the register 602. The output of the register 602 is sent to an input of a 4:1 multiplexer 604. Once the previous symbol is determined (e.g., based on the decision line input 420), the output 422 corresponding to the correct tap weight compensation is selected using the 4:1 multiplexer (MUX) 604.

In various embodiments, signals using other modulation schemes (e.g., non-return-to-zero (NRZ)/PAM-2) may be used while remaining within the scope of the present disclosure. For example, for a PAM-2 signal, each DFE block may have two speculative paths (with offsets of +h1 and −h1 respectively). A 2:1 multiplexer (MUX) may be used to select the correct compensation.

Illustrated in FIG. 6 is a diagram of an example of the DFE[i], wherein i=0. The DFE[0] receives F[0] at the input 418, and receives the FF output 426 at the select line input 420. The select line input 420 may include the D[N−1], which is associated with F[N−1] of the last clock cycle of the received F[0]. The select line input 420 may be used to determine the output D[0] associated with the received F[0]. The output D[0] is sent to the select line input 420 of DFE[1].

Illustrated in FIG. 7 is a diagram of an example of the DFE[i], wherein 1<=i<=N−2. The DFE[i] receives F[i] at the input 418, and receives the detected data D[i−1] (e.g., associated with F[i−1] of the same clock cycle as the received F[i]) from the DFE[i−1] at the select line input 420. The select line input 420 may be used by the DFE[i] to determine the output D[i] associated with the received F[i]. The output D[i] is sent to the select line input 420 of DFE[i+1].

Illustrated in FIG. 8 is a diagram of an example of the DFE[i], where i=N−1. The DFE[N−1] receives F[N−1] at the input 418, and receives the detected data D[N−2] (e.g., associated with F[N−2] of the same clock cycle as the received F[N−1]) from the DFE[N−2]. The select line input 420 may be used by the DFE[N−1] to determine the output D[N−1] associated with the received F[N−1]. The output 422 is sent to the FF 424, and an output 426 of the FF 424 is sent to the select line input 420 of DFE[0]. The DFE[0] may use the received DFE[N−1] to determine the output D[0] of the next clock cycle.

Figure 9:
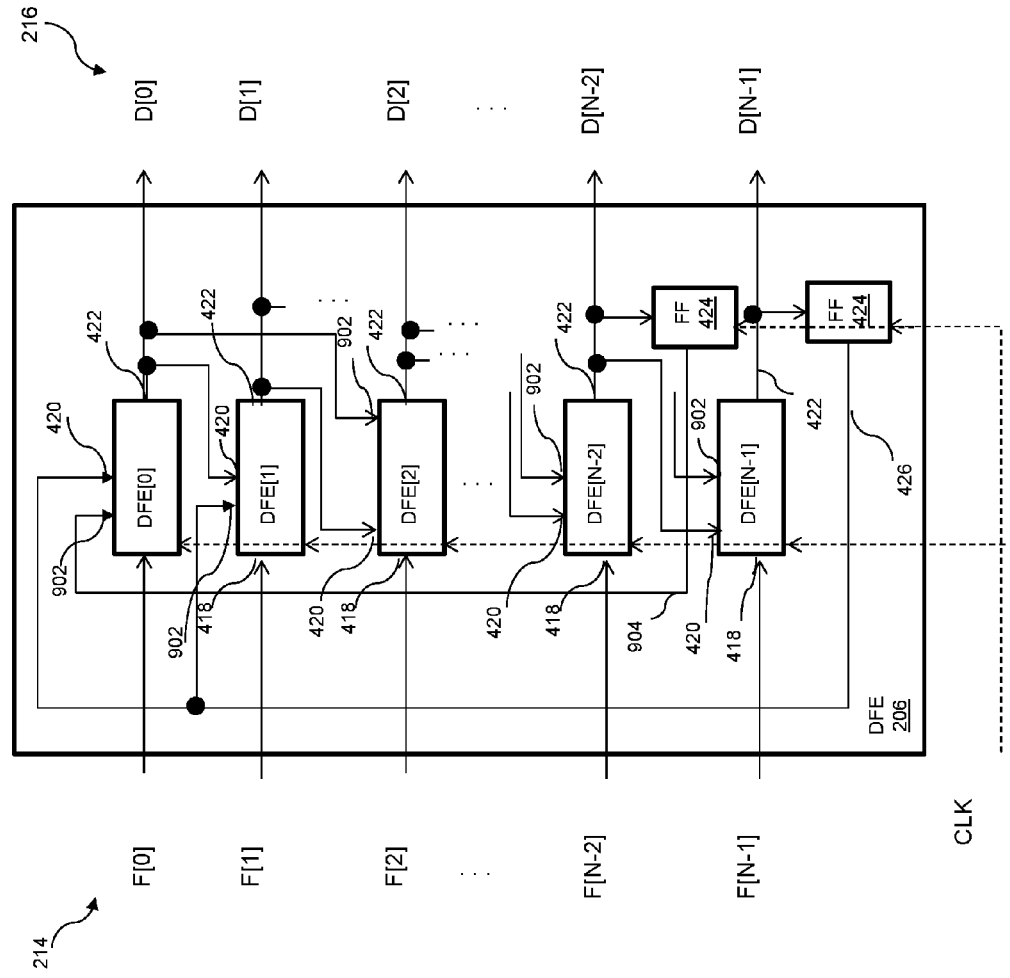
FIG. 9 is a block diagram of an exemplary decision feedback equalizer.

In various embodiments, various DFE tap number k may be used. Referring to FIGS. 9, 10, 11, 12, 13, and 14, an example of a two-tap DFE 206 is illustrated. As illustrated in the example of FIG. 9, when more than one DFE tap is used, for more than one DFE block of the DFE 206, a data storage element may be used to store and align the output 422 with the slow clock 512 for the next clock cycle.

Referring to FIG. 9, illustrated is an example of a DFE 206 where the DFE tap number k is two. The DFE 206 may include N DFE blocks, where the $i^{th}$ DFE block may be referred to as DFE[i], where i is an integer and 0<=i<=N−1. Each of the N DFE blocks (e.g., DFE[i]) may include an input 418 receiving a corresponding symbol of the FFE parallel output 214 (e.g., F[i]), a select line input 902 receiving first previously detected data (e.g., D[i−2]), a select line input 420 receiving second previously detected data (e.g., D[i−1]), and provide an output 422 (e.g., D[i]) including data of the DFE output 216.

In the example of FIG. 9, some DFE blocks may receive the first previously detected data and/or the second previously detected data of the last clock cycle, where data storage elements may be used to store and align these previously detected data. For example, DFE[0] receives at its select line input 902, a first previously detected data (e.g., FF output 904 associated with D[N−2] of the last clock cycle) from the FF 424 coupled to DFE[N−2]. DFE[0] also receives a second previously detected data (e.g., FF output 426 associated with D[N−1] of the last clock cycle) from the FF 424 coupled to DFE[N−1] at its select line input 420. For further example, DFE[1] receives, at its select line input 902, a first previously detected data (e.g., FF output 426 associated with D[N−1] of the last clock cycle) from the FF 424 coupled to DFE[N−1]. DFE[1] also receives, at its select line input 420, a second previously detected data D[0] directly from DFE[0] without using any data storage element coupled to the output 422 of DFE[0].

In the example of FIG. 9, some other DFE blocks receive the first previously detected data and the second previously detected data directly from the output 422 of other DFE blocks without using any data storage element coupled to the output 422. For example, each of the DFE[i], where 2<=i<=N−1, may receive D[i−2] from DFE[i−2] at its select line input 902, and receive D[i−1] at its select line input 420 from DFE[i−1].

In some embodiments, based on the first previously detected data received at the select line input 902, each of the DFE block may perform a first selection to provide an intermediate result selected from a plurality of speculation paths (e.g., by using a first multiplexer). A first selection delay between the select line input 902 and the intermediate result may be caused by the first decision (e.g., by a mux delay of the first multiplexer). Based on the second previously detected data received at the select line input 420, the DFE[i] may perform a second selection to provide the output 422 selected from the intermediate result (e.g., by using a second multiplexer). A second selection delay (e.g., between the intermediate result and the output 422 or between select line input 420 and the output 422) may be caused by the second decision (e.g., by a mux delay of the second multiplexer).

Figure 10:
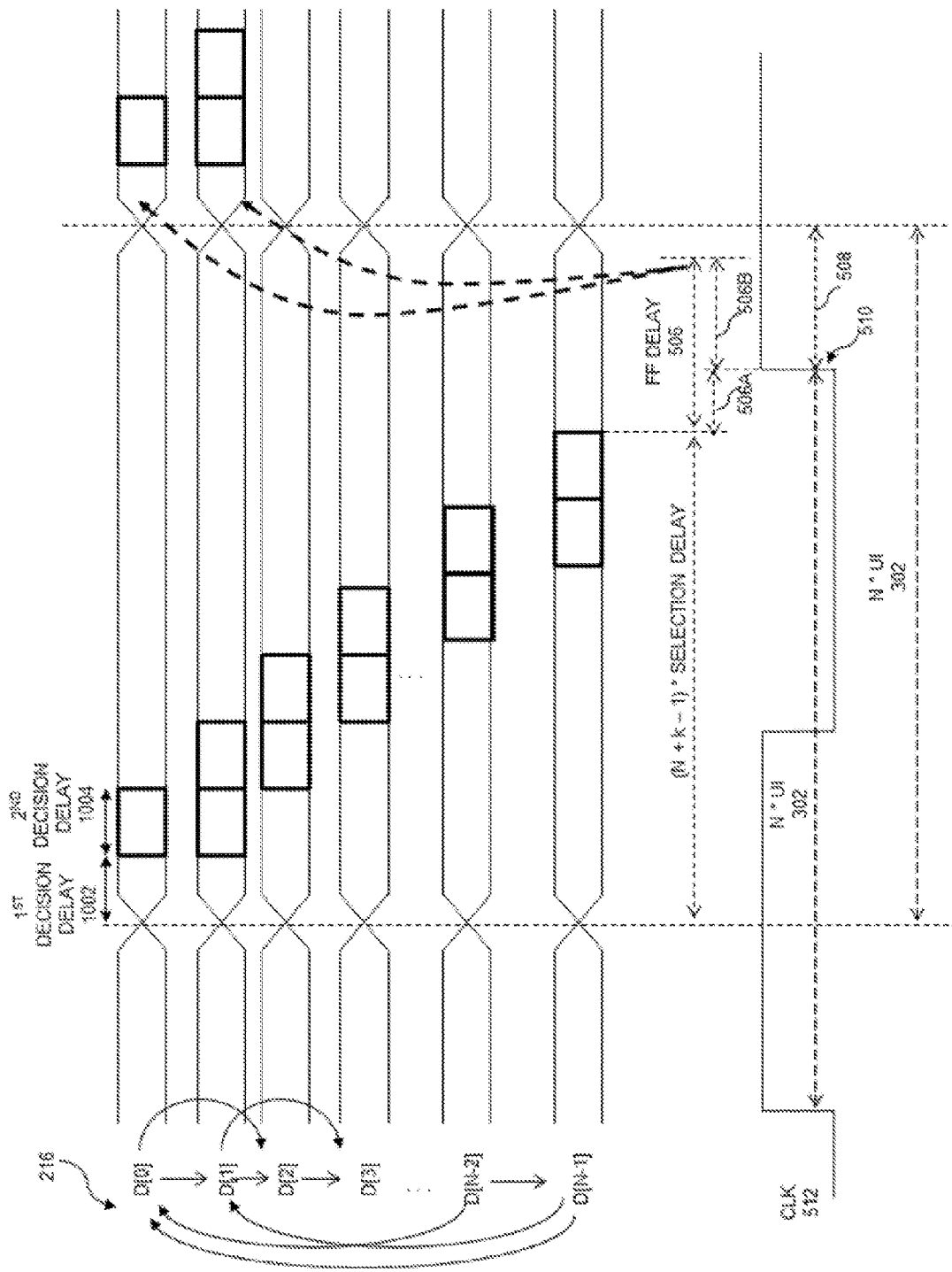
FIG. 10 is a timing diagram of signals of an exemplary decision feedback equalizer according to some embodiments of the present disclosure.

Referring now to FIG. 10, illustrated is an example of a timing diagram of the DFE 206 of FIG. 9. As discussed above with reference to FIG. 5, the timing requirements of the DFE 206 are provided as follows:

$$(N+k-1)*\text{Selection delay}+FF\text{ Delay}<=N*UI.$$

In the example of the DFE 206 of FIG. 9, where the DFE tap number k is two, the timing requirements of the DFE 206 are provided as follows:

$$(N+1)*\text{Selection delay}+FF\text{ Delay}<=N*UI.$$

As illustrated in the example of FIG. 10, there is a delay between the data input and D[0] including a first selection delay 1002 and a second selection delay 1004. For example, the first selection delay 1002 may be caused by a first multiplexer of DFE[0] making a first selection using a first previously detected data. For further example, the second selection delay 1004 may be caused by a second multiplexer of DFE[0] making a second selection using a second previously detected data. Note that a second selection delay 1004 of DFE[i] may overlap a first selection delay 1002 for DFE[i+1]. As such, the total delay between the input 418 and D[N−1] may be calculated as:

$$(N+1)*\text{Selection delay}.$$

In some embodiments, while the DFE 206 of FIG. 9 includes two data storage elements (e.g., FF 424), because the two data storage elements are used to align the stored data with the same slow clock, the FF delay 506 caused by the two data storage elements overlap. Therefore, the addition of the data storage element in the DFE 206 of FIG. 9 does not affect the timing requirements of the DFE 206.

Referring now to FIGS. 11, 12, 13, 14, and 15, illustrated are examples of the details of the DFE blocks of the DFE 206, in particular, DFE[0], DFE[1], DFE[i], DFE[N−2], and DFE[N−1] respectively. The input symbols F[i] are PAM-4 symbols substantially similar to the PAM-4 symbols discussed above with reference to FIGS. 6, 7, and 8. Because each of the two previously detected PAM-4 symbols may have one of four different values (with normalized signal levels of −3, −1, +1, and +3), each DFE block now has 16 speculative paths. The 16 speculative paths have tap weights of +3h2+3h1, +3h2+h1, +3h2−h1, +3h2−3h1, +h2 +3h1, +h2 +h1, +h2 −h1, +h2−3h1, −3h2+3h1, −3h2+h1, −3h2−h1, −3h2−3h1, −3h2+3h1, −3h2+h1, −3h2−h1, and −3h2−3h1 respectively. For each speculative path, the respective tap weight is applied to the input data F[i] using one or more adders 606. After applying the respective tap weight, the output is provided to a register 602 to produce a tentative data decision. The sixteen outputs of the register 602 are sent to inputs of a 16:4 multiplexer 1102. Upon receiving the first previously detected data from the select line input 902, an intermediate result is selected by the 16:4 multiplexer 1102 using the select line input 902. In an example, the first previously detected data has a normalized signal level of +3, and the 16:4 multiplexer 1102 provides an intermediate result 1102 including four tentative data decisions having tap weights of +3h2+3h1, +3h2+h1, +3h2−h1, and +3h2−3h1 respectively. The intermediate results 1102 is provided to inputs of a 4:1 multiplexer 604, where an output 422 is selected using the second previously detected data received at the select line input 420. In an example, the second previously detected data has a normalized signal level of −1, and the 4:1 multiplexer 604 selects the tentative data decision having a tap weight of +3h2−h1 is selected to provide the output 422.

In various embodiments, signals using other modulation schemes (e.g., non-return-to-zero (NRZ)/PAM-2) may be used while remaining within the scope of the present disclosure. For example, in some embodiments, the input symbol is a PAM-2 symbol, and each DFE block may have four speculative paths (with tap weights of +h2+h1, +h2−h1, −h1+h1, and −h2−h1 respectively). Two 2:1 multiplexers may be used to select the output 422.

Figure 11:
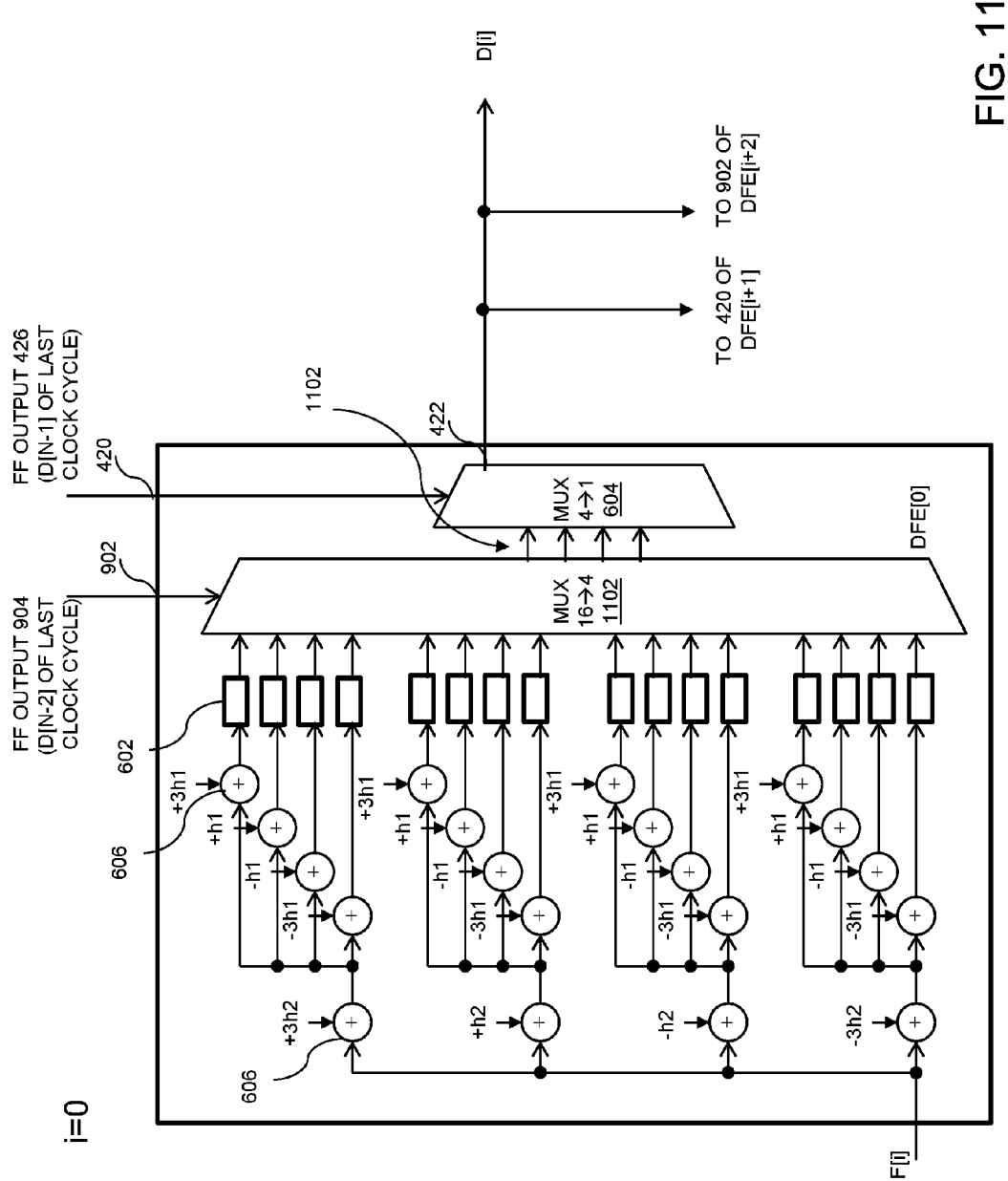
FIG. 11 is a block diagram of an exemplary DFE block of the decision feedback equalizer according to some embodiments of the present disclosure.

Illustrated in FIG. 11 is a diagram of an example of the DFE[0]. The DFE[0] receives the FF output 426 (associated with D[N−1] of the last clock cycle) at its select line input 420, and sends the select line input 420 to an input of the 4:1 multiplexer 604. The DFE[0] also receives the FF output 904 (associated with D[N−2] of the last clock cycle) at its select line input 902, and sends the select line input 902 to an input of its 16:4 multiplexer 1102. The DFE[0] may send D[0] from its output 422 to the select line input 420 of DFE[1] and the select line input 902 of DFE[2].

Figure 12:
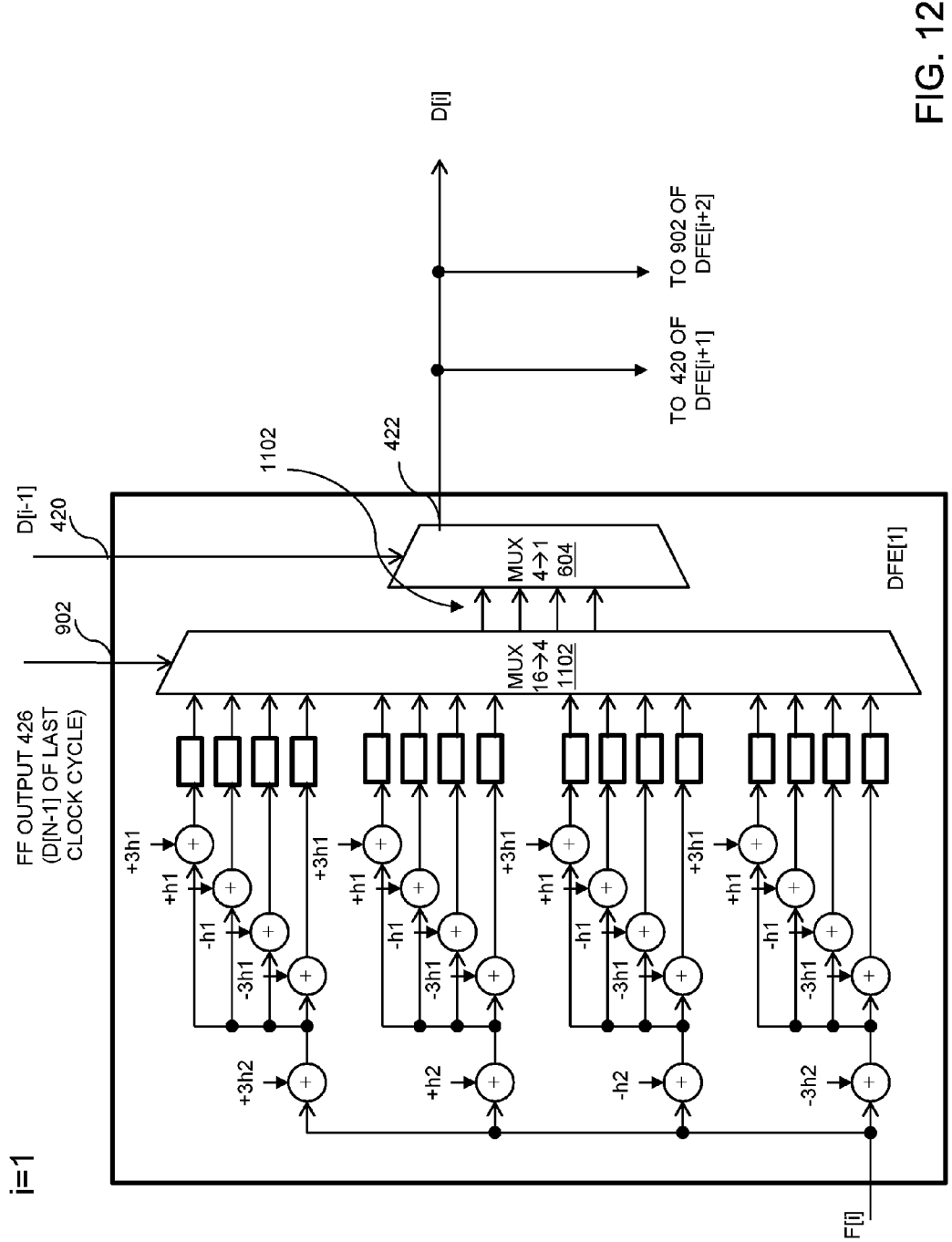
FIG. 12 is a block diagram of an exemplary DFE block of the decision feedback equalizer according to some embodiments of the present disclosure.

Illustrated in FIG. 12 is a diagram of an example of the DFE[1]. The DFE[1] receives D[0] from the DFE[0] at its select line input 420, and sends the select line input 420 to an input of the 4:1 multiplexer 604. The DFE[0] also receives the FF output 426 (associated with D[N−1] of the last clock cycle) at its select line input 902, and sends the select line input 902 to an input of its 16:4 multiplexer 1102. The DFE[1] may send D[1] from its output 422 to the select line input 420 of DFE[2] and the select line input 902 of DFE[3].

Figure 13:
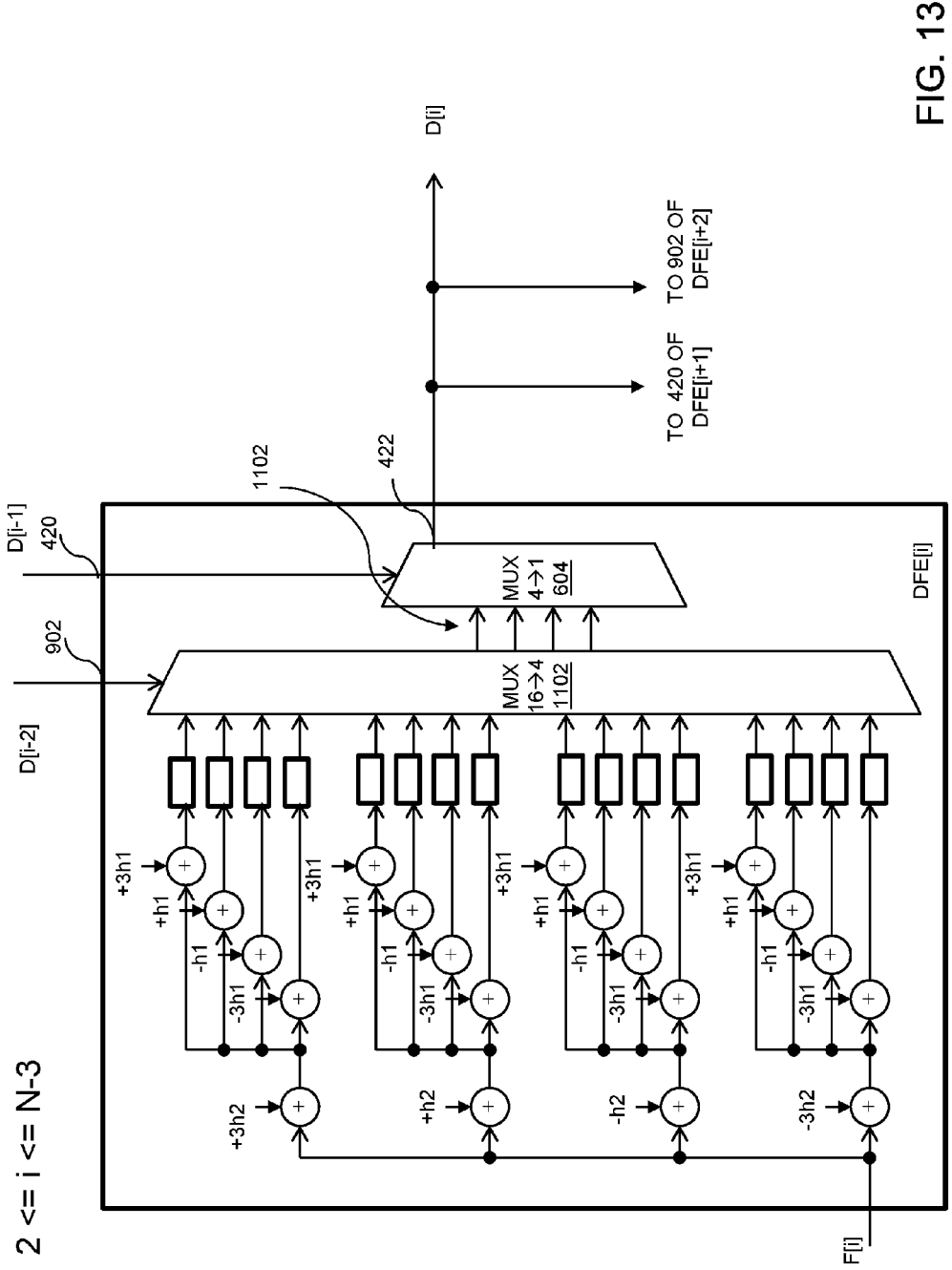
FIG. 13 is a block diagram of an exemplary DFE block of the decision feedback equalizer according to some embodiments of the present disclosure.

Illustrated in FIG. 13 is a diagram of an example of the DFE[i], where i is an integer, and 2<=i<=N−3. The DFE[i] receives D[i−1] from the DFE[i−1] at its select line input 420, and sends the select line input 420 to an input of the 4:1 multiplexer 604. The DFE[i] also receives D[i−2] from the DFE[i−2] at its select line input 902, and sends the select line input 902 to an input of its 16:4 multiplexer 1102. The DFE[i] may send D[i] from its output 422 to the select line input 420 of DFE[i+1] and the select line input 902 of DFE[i+2].

Figure 14:
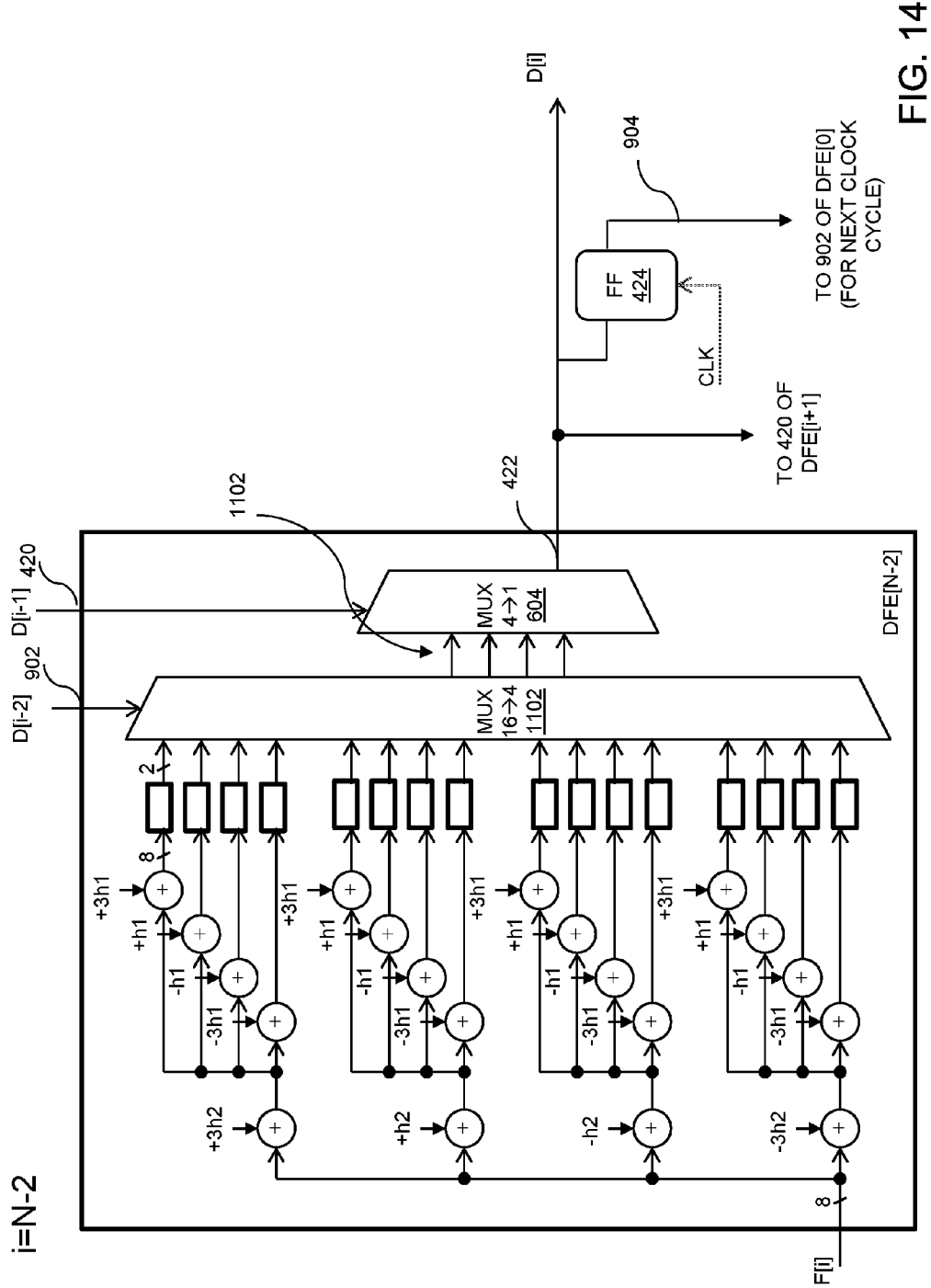
FIG. 14 is a block diagram of an exemplary DFE block of the decision feedback equalizer according to some embodiments of the present disclosure.

Illustrated in FIG. 14 is a diagram of an example of the DFE[N−2]. The DFE[N−2] receives D[N−3] from the DFE[N−3] at its select line input 420, and sends the select line input 420 to an input of the 4:1 multiplexer 604. The DFE[N−2] also receives D[N−4] at its select line input 902, and sends the select line input 902 to an input of its 16:4 multiplexer 1102. The DFE[N−2] may send D[N−2] from its output 422 to the select line input 420 of DFE[N−1]. The DFE[N−2] may also send D[N−2] from its output 422 to an input of the FF 424, which provides an output 904 to the select line input 902 of DFE[0] for the next clock cycle.

Figure 15:
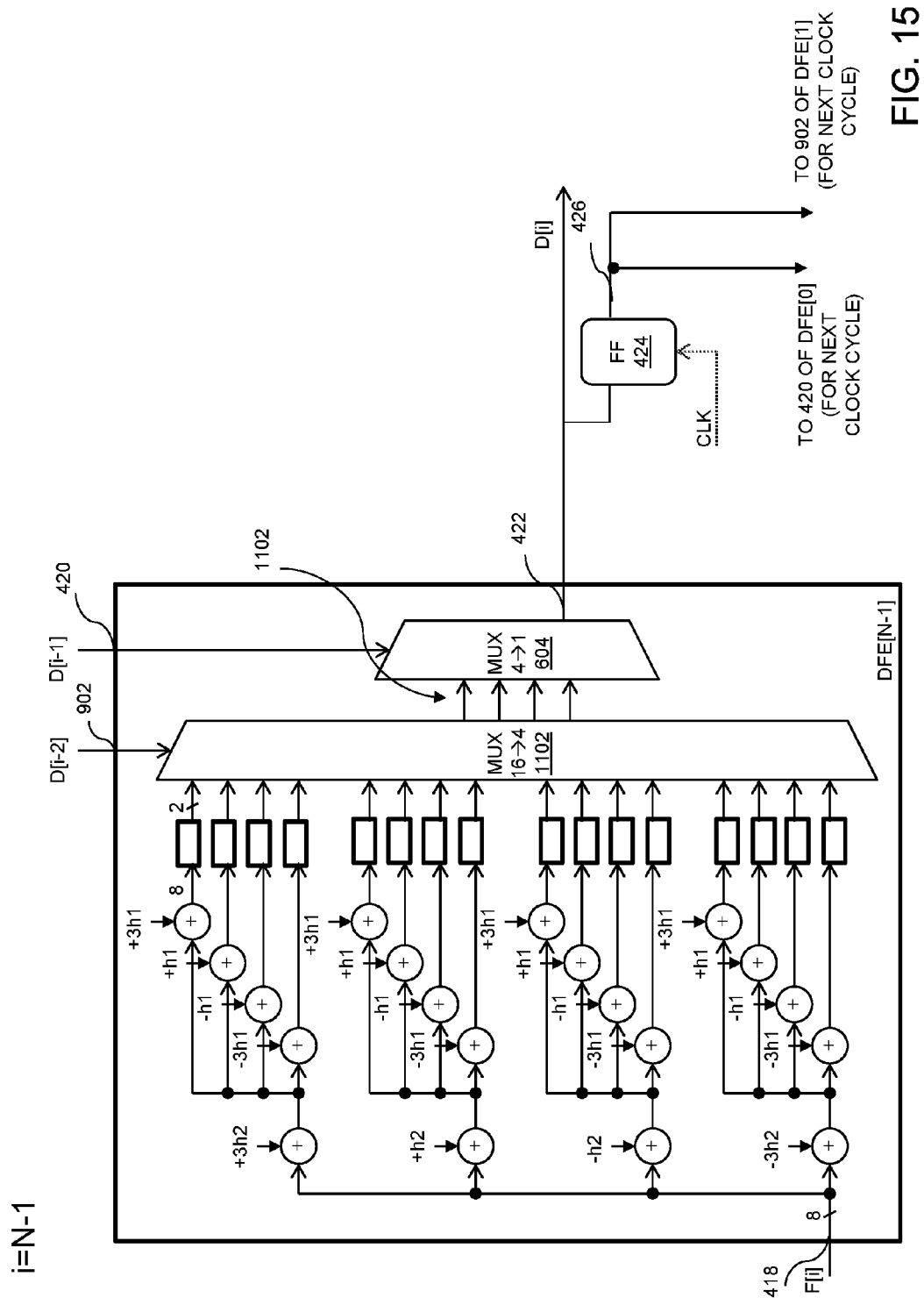
FIG. 15 is a block diagram of an exemplary DFE block of the decision feedback equalizer according to some embodiments of the present disclosure.

Illustrated in FIG. 15 is a diagram of an example of the DFE[N−1]. The DFE[N−1] receives D[N−2] from the DFE [N−2] at its select line input 420, and sends the select line input 420 to an input of the 4:1 multiplexer 604. The DFE[N−1] also receives D[N−3] at its select line input 902, and sends the select line input 902 to an input of its 16:4 multiplexer 1102. The DFE[N−1] may send D[N−1] from its output 422 to an input of the FF 424, which may send its output 426 to the select line input 420 of DFE[0] and the select line input 902 of DFE[0] for the next clock cycle.

It is noted that various configurations (e.g., N, k) discussed above with reference to FIGS. 2-15 are exemplary only and not intended to be limiting beyond what is specifically recited in the claims that follow. It will be understood by those skilled in the art that other configurations may be used. For example, the DFE tap number k may be an number other than one and two while remaining within the scope of the present disclosure.

Various advantages may be present in various applications of the present disclosure. No particular advantage is required for all embodiments, and different embodiments may offer different advantages. One of the advantages in some embodiments is that by providing parallel symbols to the data input of a DFE, the timing requirements of a DFE are relaxed. For example, the requirement (e.g., k*Selection Delay+FF delay<1 UI) to complete the decision feedback equalization for a symbol in one UI for handling the symbol arriving in one UI at a time is removed. By handling N symbols arrived in parallel, a DFE aligns one or more previously detected data with a slow clock (e.g., with a clock cycle time of N*UI), which produces a saving of (N−1)*FF Delay compared to handling N symbols arriving in one UI at a time. Another advantage in some embodiments is that by handling N symbols arrived in parallel, in a multi-tap DFE, the selection delays of the DFE blocks partially overlap, which may produce a saving of (N−1)*(k−1)*Selection Delay compared to handling N symbols arriving in one UI at a time.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. An apparatus, comprising:
a decision feedback equalizer configured to receive a parallel signal generated based on a first clock, wherein the decision feedback equalizer includes:
a first equalization block configured to:
receive a first symbol of a first set of parallel symbols provided by the parallel signal during a first clock cycle of the first clock; and
perform a first decision feedback equalization to the first symbol to provide a first decision during the first clock cycle
a second equalization block configured to:
receive a second symbol of the first set of parallel symbols; and
after the performing the first decision feedback equalization, perform a second decision feedback equalization to the second symbol to provide a second decision during the first clock cycle; and
a first storage element configured to:
receive the second decision during the first clock cycle; and
provide the second decision received from the second equalization block to the first equalization block during a second clock cycle of the first clock.

2. The apparatus of claim 1, wherein the decision feedback equalizer includes:
a third equalization block configured to:
receive the first decision from the first equalization block;
receive a third symbol of the first set of parallel symbols; and
prior to the performing the second decision feedback equalization, perform a third decision feedback equalization to the third symbol using the first decision to provide a third decision during the first clock cycle.

3. The apparatus of claim 2, wherein the first equalization block is configured to:
receive a fourth symbol of a second set of parallel symbols provided by the parallel signal during the second clock cycle of the first clock; and
perform a fourth decision feedback equalization to the fourth symbol using the second decision received from the first storage element to provide a fourth decision determined using the second decision received from the first storage element during the second clock cycle.

4. The apparatus of claim 2, wherein the first storage element is a flip-flop.

5. The apparatus of claim 2, wherein each of the first, second, and third equalization blocks includes:
a selection line input configured to receive a decision based on previously detected symbols; and
a selection element coupled to a plurality of speculation paths to select an output from the speculation paths using the selection line input.

6. The apparatus of claim 5, wherein the selection element is a multiplexer.

7. The apparatus of claim 6, wherein a delay between the first decision provided by the first equalization block and the third decision provided by the third equalization block includes a selection delay caused by the multiplexer of the third equalization block.

8. The apparatus of claim 7, wherein the first storage element includes a flip-flop configured to receive the second decision from the second equalization block at least a set-up time of the flip-flop prior to a next clock edge of the first clock that triggers the flip-flop, and
wherein the first equalization block is configured to receive the fourth symbol at least a clock-to-Q time of the flip-flop after the next clock edge.

9. The apparatus of claim 1, wherein symbols provided by the parallel signal are PAM-4 symbols.

10. The apparatus of claim 1, wherein the parallel signal is provided by an analog-to-digital converter (ADC) using an input signal having a symbol rate,
wherein the symbol rate is N times a clock rate of the first clock, and
wherein N is a number of parallel symbols provided by the parallel signal.

11. A method, comprising:
providing a parallel signal generated based on a first clock;
receiving, by a first equalization block, a first symbol of a first set of parallel symbols provided by the parallel signal during a first clock cycle of the first clock;
performing, by the first equalization block, a first decision feedback equalization to the first symbol to provide a first decision during the first clock cycle
receiving, by a second equalization block, a second symbol of the first set of parallel symbols;
after the performing the first decision feedback equalization, performing, by the second equalization block, a second decision feedback equalization to the second symbol to provide a second decision to a first storage element during the first clock cycle; and
providing, by the first storage element, the second decision received from the second equalization block to the first equalization block during a second clock cycle of the first clock.

12. The method of claim 11, further comprising:
receiving, by a third equalization block, a third symbol of the first set of parallel symbols;
receiving, from the first equalization block by the third equalization block, the first decision; and
prior to the performing the second decision feedback equalization, performing, by the third equalization block, a third decision feedback equalization to the third symbol using the first decision to provide a third decision during the first clock cycle.

13. The method of claim 12, further comprising:
receiving, by the first equalization block, a fourth symbol of a second set of parallel symbols provided by the parallel signal during the second clock cycle of the first clock; and
performing, by the first equalization block, a fourth decision feedback equalization to the fourth symbol using the second decision received from the first storage element to provide a fourth decision determined using the second decision received from the first storage element during the second clock cycle.

14. The method of claim 12, wherein the first storage element is a flip-flop.

15. The method of claim 12, further comprising:
selecting, by a selection element of the third equalization block, an output from a plurality of speculation paths using the first decision received by the third equalization block.

16. The method of claim 15, wherein the selection element is a multiplexer.

17. The method of claim 16, wherein a delay between the first decision provided by the first equalization block and the third decision provided by the third equalization block includes a selection delay caused by the multiplexer of the third equalization block.

18. The method of claim 17, wherein the first storage element includes a flip-flop, further comprising:
- receiving, by the first storage element, the second decision from the second equalization block at least a set-up time of the flip-flop prior to a next clock edge of the first clock that triggers the flip-flop; and
- receiving, by the first equalization block, the fourth symbol at least a clock-to-Q time of the flip-flop after the next clock edge.

19. The method of claim 11, wherein symbols provided by the parallel signal are PAM-4 symbols.

20. The method of claim 11, comprising:
- providing an analog input signal having a symbol rate to an analog-to-digital converter (ADC); and
- converting the analog input signal to the parallel signal using the ADC based on the first clock,
  - wherein the symbol rate is N times a clock rate of the first clock, and
  - wherein N is a number of parallel symbols provided by the parallel signal.

\* \* \* \* \*